(12) United States Patent
Loebl et al.

(10) Patent No.: US 8,536,796 B2
(45) Date of Patent: Sep. 17, 2013

(54) LIGHT EMITTING DIODE DRIVING APPARATUS

(75) Inventors: Hans-Peter Loebl, Monschau-Imgenbroich (DE); Stefan P. Grabowski, Neuss (DE)

(73) Assignee: Koninklijke Philips N.V., Eindhoven (NL)

( * ) Notice: Subject to any disclaimer, the term of this patent is extended or adjusted under 35 U.S.C. 154(b) by 250 days.

(21) Appl. No.: 13/124,944

(22) PCT Filed: Oct. 15, 2009

(86) PCT No.: PCT/IB2009/054532
§ 371 (c)(1), (2), (4) Date: Apr. 19, 2011

(87) PCT Pub. No.: WO2010/046813
PCT Pub. Date: Apr. 29, 2010

(65) Prior Publication Data
US 2011/0199009 A1    Aug. 18, 2011

(30) Foreign Application Priority Data
Oct. 21, 2008  (EP) ..................... 08167089

(51) Int. Cl.
*H05B 37/02* (2006.01)
*G05F 1/00* (2006.01)

(52) U.S. Cl.
USPC ............ 315/291; 315/302; 315/297; 362/800

(58) Field of Classification Search
USPC ..... 315/291, 312, 297, 302, 185 R; 362/230, 362/237, 800
See application file for complete search history.

(56) References Cited

U.S. PATENT DOCUMENTS

| | | | |
|---|---|---|---|
| 6,727,660 B1 | 4/2004 | Hller | |
| 7,393,119 B2 | 7/2008 | Lebens et al. | |
| 7,663,323 B2* | 2/2010 | Telefont | 315/291 |
| 7,902,768 B2* | 3/2011 | Zanforlin | 315/282 |
| 7,902,771 B2* | 3/2011 | Shteynberg et al. | 315/307 |
| 8,264,169 B2* | 9/2012 | Shteynberg et al. | 315/307 |
| 2004/0021425 A1 | 2/2004 | Foust et al. | |
| 2007/0216610 A1 | 9/2007 | Smith | |
| 2008/0116818 A1 | 5/2008 | Shteynberg et al. | |
| 2010/0052554 A1* | 3/2010 | Zanforlin | 315/210 |

FOREIGN PATENT DOCUMENTS

| | | |
|---|---|---|
| EP | 1320284 A2 | 6/2003 |
| WO | 2007093927 A1 | 8/2007 |
| WO | 2008070372 A1 | 6/2008 |

* cited by examiner

*Primary Examiner* — Daniel D Chang
(74) *Attorney, Agent, or Firm* — Mark L. Beloborodov

(57) ABSTRACT

A light emitting diode driving apparatus (1) comprises an arrangement (10) for supplying a signal to light emitting diodes (11, 12). The light emitting diodes (11, 12) comprise different internal impedances (41, 42) for producing different light outputs in response to a parameter of the signal having different values. As a result, the light emitting diodes (11, 12) can be driven relatively independently from each other. Each light output may have an intensity and/or a color. Different light outputs may have different intensities for dimming purposes and/or different colors for color tuning purposes. The parameter may comprise a frequency parameter and/or a timing parameter. The light emitting diodes (11, 12) may form parts of a serial branch, for example when being stacked organic light emitting diodes, or may form part of parallel branches. The internal impedances (41, 42) may comprise capacities (21, 22) and resistivities (31, 32).

15 Claims, 2 Drawing Sheets

LIGHT EMITTING DIODE DRIVING APPARATUS

FIELD OF THE INVENTION

The invention relates to a light emitting diode driving apparatus comprising an arrangement for supplying a signal to a group of first and second light emitting diodes, and also relates to a device comprising such an apparatus, and to a light emitting diode driving method.

Examples of such an apparatus are lamps comprising light emitting diodes, and examples of such a device are consumer products and non-consumer products.

BACKGROUND OF THE INVENTION

The document US 2008/0116818 discloses a time division modulation with an average current regulation for an independent control of arrays of light emitting diodes. Thereto, as shown in FIG. 7 of US 2008/0116818, a time division multiplexer, a current sensor multiplexer, a voltage sensor multiplexer, an analog-to-digital converter, a comparator, some control logic and drivers are required.

SUMMARY OF THE INVENTION

It is an object of the invention to provide a relatively simple apparatus for relatively individually driving light emitting diodes. It is a further object of the invention to provide a device comprising such an apparatus. It is a yet further object of the invention to provide a relatively simple method for relatively individually driving light emitting diodes.

According to a first aspect, a light emitting diode driving apparatus is provided comprising an arrangement for supplying a signal to a group of first and second light emitting diodes, wherein the first light emitting diode comprises a first internal impedance for in response to a parameter of the signal having a first value producing a first light output and for in response to the parameter having a second value different from the first value producing a second light output, the second light emitting diode comprises a second internal impedance different from the first internal impedance for in response to the parameter having the first value producing a third light output and for in response to the parameter having the second value producing a fourth light output, and a first ratio is defined by the first light output divided by the second light output, a second ratio is defined by the third light output divided by the fourth light output, the first ratio being different from the second ratio.

Owing to the fact that the first and second light emitting diodes comprise different internal impedances, and that the first ratio is different from the second ratio, the first light emitting diode can respond differently to a first change in the value of the parameter of the signal than the second light emitting diode, and the second light emitting diode can respond differently to a second change in the value of the parameter of the signal than the first light emitting diode. In other words, by supplying the signal to the first and second light emitting diodes, these light emitting diodes can be driven relatively independently from each other.

The fact that the first (second) light emitting diode comprises the first (second) internal impedance for in response to the parameter having the first/second value producing the first/second (third/fourth) light output may be considered to be equivalent to the first (second) light emitting diode comprising the first (second) internal impedance for in response to the parameter having the first/second value requiring a first/second (third/fourth) amount of power and/or energy, whereby a third ratio may be defined by the first amount of power and/or energy divided by the second amount of power and/or energy, whereby a fourth ratio may be defined by the third amount of power and/or energy divided by the fourth amount of power and/or energy, the third ratio being different from the fourth ratio.

According to an embodiment, the apparatus is defined by each light output having an intensity and/or a color. Different light outputs will have different intensities and/or different colors. Preferably, the apparatus is defined by the first ratio being different from the second ratio owing to the fact that a difference between intensities of the first and second light outputs differs from a difference between intensities of the third and fourth light outputs and/or that a difference between colors of the first and second light outputs differs from a difference between colors of the third and fourth light outputs. The differences between the intensities correspond to dimming one of the light emitting diodes more or less than the other one, in other words to dimming the light emitting diodes relatively individually. The differences between the colors correspond to color tuning one of the light emitting diodes more or less than the other one, in other words to color tuning the light emitting diodes relatively individually.

According to an embodiment, the apparatus is defined by the arrangement being arranged for in response to a selection of at least one of the values of the parameter controlling the driving of at least one of the first and second light emitting diodes. The selection allows the driving of the light emitting diodes to be controlled in a relatively individual way. Preferably, the apparatus is defined by said controlling comprising an intensity adaptation and/or a color adaptation. The intensity of one of the light emitting diodes may be adapted relatively independently from the intensity of the other one of the light emitting diodes. The color of one of the light emitting diodes may be adapted relatively independently from the color of the other one of the light emitting diodes.

According to an embodiment, the apparatus is defined by the parameter comprising a frequency parameter and/or a timing parameter. The frequency parameter may be a frequency of the signal or of a component of the signal, such as a pulse, and the timing parameter may be a duration or a duty cycle of the signal or of a component of the signal, such as a pulse.

According to an embodiment, the apparatus is defined by the first and second light emitting diodes forming parts of a serial branch. Preferably, the apparatus is defined by the first and second light emitting diodes being stacked organic light emitting diodes. Further preferably, the apparatus is defined by the stacked organic light emitting diodes being separated by a transparent electrode that is electrically coupled to the arrangement via at least one of the organic light emitting diodes. The electrodes between stacked organic light emitting diodes are more difficult to be reached than the electrodes at the top and bottom of the stacked organic light emitting diodes. So, especially for stacked organic light emitting diodes it may be interesting to drive a group of light emitting diodes relatively individually while only supplying one adaptable signal to the group.

According to an embodiment, the apparatus is defined by the respective first and second light emitting diodes forming parts of respective first and second parallel branches.

According to an embodiment, the apparatus is defined by the first internal impedance comprising a first capacity and a first resistivity, the second internal impedance comprising a second capacity and a second resistivity, the first and second capacities having different values and/or the first and second resistivities having different values. Such a combination of a capacity and a resistivity may be a parallel combination having a more blocking/less passing character below a cut-off frequency and having a more passing/less blocking character above this cut-off frequency.

According to an embodiment, the apparatus is defined by comprising a first external impedance coupled to the first light emitting diode, and a second external impedance coupled to the second light emitting diode.

Such a first (second) external impedance may improve a performance of the first (second) internal impedance and/or add an additional performance to the first (second) internal impedance. The first (second) external impedance may be coupled serially or in parallel to the first (second) internal impedance.

According to a second aspect, a device is provided comprising the apparatus and a power supply for supplying power to the apparatus.

According to a third aspect, a light emitting diode driving method is provided comprising a step of supplying a signal to a group of first and second light emitting diodes, wherein the first light emitting diode comprises a first internal impedance for in response to a parameter of the signal having a first value producing a first light output and for in response to the parameter having a second value different from the first value producing a second light output, the second light emitting diode comprises a second internal impedance different from the first internal impedance for in response to the parameter having the first value producing a third light output and for in response to the parameter having the second value producing a fourth light output, and a first ratio is defined by the first light output divided by the second light output, a second ratio is defined by the third light output divided by the fourth light output, the first ratio being different from the second ratio.

An insight may be that a value of an impedance may depend on a value of a parameter of a signal supplied to the impedance.

A basic idea may be that different light emitting diodes should have different internal impedances to react differently to different values of a parameter of a signal supplied to the light emitting diodes.

A problem to provide a relatively simple apparatus for relatively individually driving light emitting diodes has been solved.

A further advantage may be that a number of connections in the apparatus may be reduced.

These and other aspects of the invention are apparent from and will be elucidated with reference to the embodiment(s) described hereinafter.

DETAILED DESCRIPTION OF EMBODIMENTS

Figure 1:
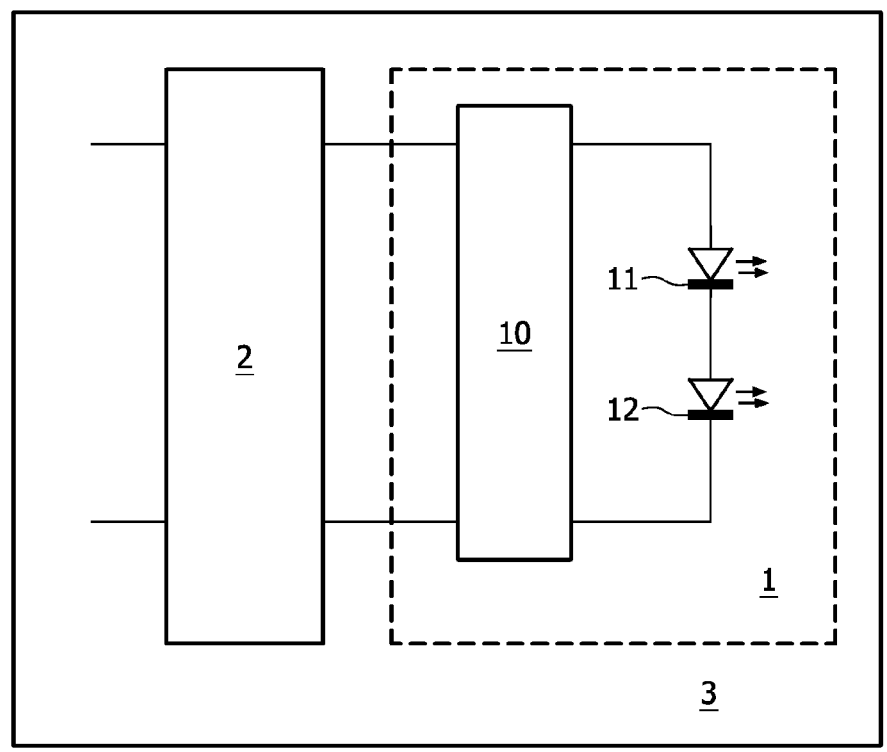
FIG. 1 shows a device comprising a light emitting diode driving apparatus.

In the FIG. 1, a device 3 is shown comprising a light emitting diode driving apparatus 1 coupled to a power supply 2 such as a battery or a converter. The apparatus 1 comprises an arrangement 10 for supplying a signal such as a current signal (or a voltage signal) to a group of first and second light emitting diodes 11 and 12 here connected serially. Alternatively, these light emitting diodes may be connected in parallel. More than two light emitting diodes are not to be excluded. When connected serially, the first and second light emitting diodes 11 and 12 may be stacked organic light emitting diodes, separated by a transparent electrode that is electrically coupled to the arrangement 10 via at least one of the organic light emitting diodes. The electrodes between stacked organic light emitting diodes are more difficult to be reached than the electrodes at the end of the stacked organic light emitting diodes, in which case it may be interesting to drive a group of light emitting diodes relatively individually while only supplying one adaptable signal to the group.

Figure 2:
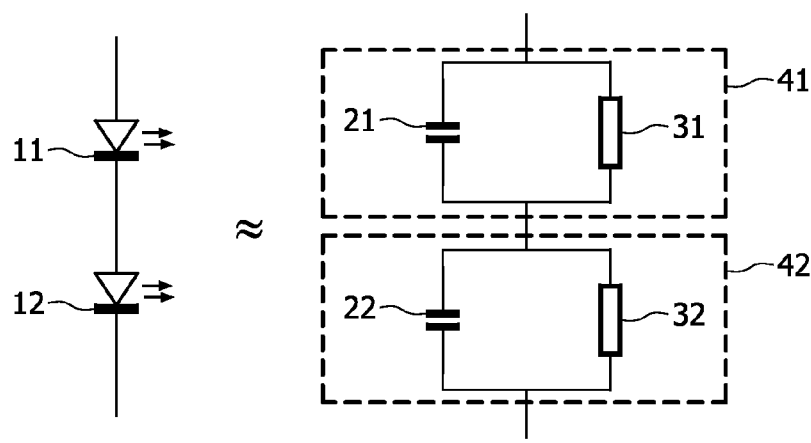
FIG. 2 shows internal impedances of light emitting diodes.

In the FIG. 2, (simplifications of) the respective first and second internal impedances 41 and 42 of the respective first and second light emitting diodes 11 and 12 are shown. The first internal impedance 41 comprises a first capacity 21 and a first resistivity 31 (resistance or resistor) connected in parallel. The second internal impedance 42 comprises a second capacity 22 and a second resistivity 32 (resistance or resistor) connected in parallel. The first and second capacities 21 and 22 have different values and/or the first and second resistivities 31 and 32 have different values.

Figure 3:
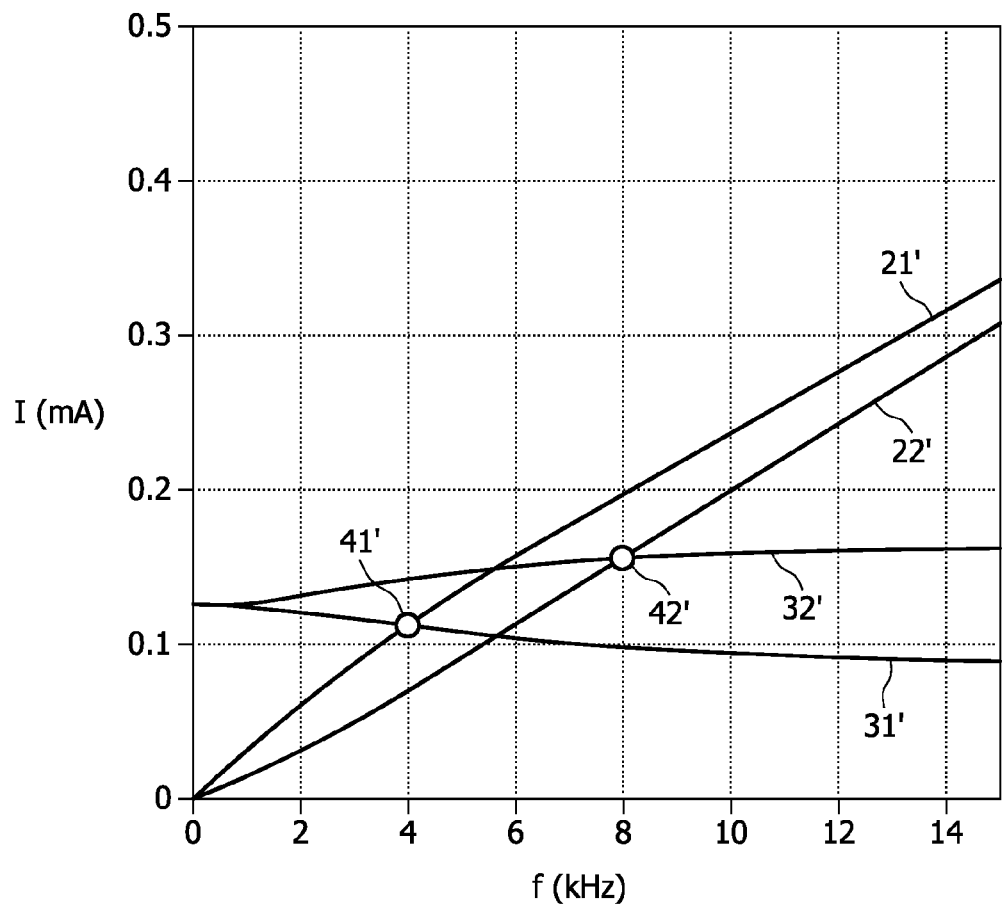
FIG. 3 shows a current versus frequency graph for each internal impedance.

In the FIG. 3, a current (in mA) versus frequency (in kHz) graph is shown for each internal impedance 41 and 42. A current flowing through the capacity 21 is indicated 21', a current flowing through the capacity 22 is indicated 22', a current flowing through the resistivity 31 is indicated 31', and a current flowing through the resistivity 32 is indicated 32'. A cut-off frequency of the internal impedance 41 is indicated 41', and a cut-off frequency of the internal impedance 42 is indicated 42', thereby assuming that the first capacity 21 has a value of 10 nF, the second capacity 22 has a value of 5 nF, the resistivities 31 and 32 each have a value of 4 kOhm, which results in the internal impedance 41 having a cut-off frequency of 4 kHz and the second internal impedance 42 having a cut-off frequency of 8 kHz ($f=1/2\pi RC$).

The first light emitting diode 11 comprises the first internal impedance 41 for in response to a parameter of the signal having a first value producing a first light output and for in response to the parameter having a second value different from the first value producing a second light output. The second light emitting diode 12 comprises a second internal impedance 42 for in response to the parameter having the first value producing a third light output and for in response to the parameter having the second value producing a fourth light output. A first ratio is defined by the first light output divided by the second light output, a second ratio is defined by the third light output divided by the fourth light output. The first and second internal impedances 41 and 42 are different from each other in such a way that the first ratio is different from the second ratio, and/or the first and second internal impedances 41 and 42 respond differently to different values of and/or changes in the parameter of the signal in such a way that the first ratio is different from the second ratio. As a result, by selecting different values of the parameter of the signal, the first and second light emitting diodes 11 and 12 can be addressed relatively individually.

Each light output may have an intensity and/or a color. The first ratio may be different from the second ratio owing to the fact that a difference between intensities of the first and second light outputs differs from a difference between intensities of the third and fourth light outputs and/or that a difference between colors of the first and second light outputs differs from a difference between colors of the third and fourth light outputs.

The arrangement 10 may be arranged for in response to a selection of at least one of the values of the parameter controlling the driving of at least one of the first and second light emitting diodes 11, 12. The selection allows the driving/addressing of the light emitting diodes to be controlled in a relatively individual way. Said controlling may comprise an intensity adaptation and/or a color adaptation. The parameter may comprise a frequency parameter and/or a timing parameter. So, the arrangement 10 for example converts a primary DC voltage or a primary AC voltage into a secondary signal such as a current or a voltage. This secondary signal has an adaptable parameter such as an adaptable frequency of the secondary signal or such as an adaptable frequency of a pulse of the secondary signal or such as an adaptable duration of the secondary signal or such as an adaptable duration of a pulse of the secondary signal or such as an adaptable duty cycle of the secondary signal or such as an adaptable duty cycle of a pulse of the secondary signal etc. In the embodiment shown in the FIG. 3, the secondary signal is an AC current at different frequencies. So, the arrangement 10 produces a secondary signal with an adaptable parameter and the arrangement 10 can change this adaptable parameter. Preferably, the arrangement 10 can control the driving of at least one of the first and second light emitting diodes 11, 12 in response to an instruction in the form of a selection of a value of the parameter from a person or another unit not shown.

Summarizing, a light emitting diode driving apparatus 1 comprises an arrangement 10 for supplying a signal to light emitting diodes 11, 12. The light emitting diodes 11, 12 comprise different internal impedances 41, 42 for producing different light outputs in response to a parameter of the signal having different values. As a result, the light emitting diodes 11, 12 can be driven relatively independently from each other. Each light output may have an intensity and/or a color. Different light outputs may have different intensities for dimming purposes and/or different colors for color tuning purposes. The parameter may comprise a frequency parameter and/or a timing parameter. The light emitting diodes 11, 12 may form parts of a serial branch, for example when being stacked organic light emitting diodes, or may form part of parallel branches. The internal impedances 41, 42 may comprise capacities 21, 22 and resistivities 31, 32.

While the invention has been illustrated and described in detail in the drawings and foregoing description, such illustration and description are to be considered illustrative or exemplary and not restrictive; the invention is not limited to the disclosed embodiments. For example, it is possible to operate the invention in an embodiment wherein different parts of the different disclosed embodiments are combined into a new embodiment.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A light emitting diode driving apparatus comprising an arrangement for supplying a signal to a group of first and second light emitting diodes, wherein the first light emitting diode comprises a first internal impedance for in response to a parameter of the signal having a first value producing a first light output and for in response to the parameter having a second value different from the first value producing a second light output, the second light emitting diode comprises a second internal impedance different from the first internal impedance for in response to the parameter having the first value producing a third light output and for in response to the parameter having the second value producing a fourth light output, and a first ratio is defined by the first light output divided by the second light output, a second ratio is defined by the third light output divided by the fourth light output, the first ratio being different from the second ratio, wherein the first and second light emitting diodes are stacked organic light emitting diodes forming parts of a serial branch.

2. The apparatus as claimed in claim 1, each light output having an intensity and/or a color.

3. The apparatus as claimed in claim 2, the first ratio being different from the second ratio owing to the fact that a difference between intensities of the first and second light outputs differs from a difference between intensities of the third and fourth light outputs and/or that a difference between colors of the first and second light outputs differs from a difference between colors of the third and fourth light outputs.

4. The apparatus as claimed in claim 1, the arrangement being arranged for in response to a selection of at least one of the values of the parameter controlling the driving of at least one of the first and second light emitting diodes.

5. The apparatus as claimed in claim 4, said controlling comprising an intensity adaptation and/or a color adaptation.

6. The apparatus as claimed in claim 1, the parameter comprising a frequency parameter and/or a timing parameter.

7. The apparatus as claimed in claim 1, stacked organic light emitting diodes being separated by a transparent electrode that is electrically coupled to the arrangement via at least one of the organic light emitting diodes.

8. The apparatus as claimed in claim 1, the respective first and second light emitting diodes forming parts of respective first and second parallel branches.

9. The apparatus as claimed in claim 1, the first internal impedance comprising a first capacity and a first resistivity, the second internal impedance comprising a second capacity and a second resistivity, the first and second capacities having different values and/or the first and second resistivities having different values.

10. The apparatus as claimed in claim 1, further comprising a first external impedance coupled to the first light emitting diode, and a second external impedance coupled to the second light emitting diode.

11. A device comprising the apparatus as claimed in claim 1 and a power supply for supplying power to the apparatus.

12. A light emitting diode driving method comprising a step of supplying a signal to a group of first and second light emitting diodes, wherein
   the first light emitting diode comprises a first internal impedance for in response to a parameter of the signal having a first value producing a first light output and for in response to the parameter having a second value different from the first value producing a second light output,
   the second light emitting diode comprises a second internal impedance different from the first internal impedance for in response to the parameter having the first value producing a third light output and for in response to the parameter having the second value producing a fourth light output, and
   a first ratio is defined by the first light output divided by the second light output, a second ratio is defined by the third light output divided by the fourth light output, the first ratio being different from the second ratio, wherein the first and second light emitting diodes are stacked organic light emitting diodes forming parts of a serial branch.

13. The method as claimed in claim 12, each light output having an intensity and/or a color, and the first ratio being different from the second ratio owing to the fact that a difference between intensities of the first and second light outputs differs from a difference between intensities of the third and fourth light outputs and/or that a difference between colors of the first and second light output differs from a difference between colors of the third and fourth light outputs.

14. The method as claimed in claim 12, the respective first and second light emitting diodes forming parts of respective first and second parallel branches.

15. The method as claimed in claim 12, the first internal impedance comprising a first capacity and a first resistivity, the second internal impedance comprising a second capacity and a second resistivity, the first and second capacities having different values and/or the first and second resistivities having different values.

* * * * *